Nov. 18, 1969  T. KIKINDAI ETAL  3,479,281
METHOD AND APPARATUS FOR THE SEPARATION
OF PHASES BY GASEOUS FLOTATION
Filed Oct. 13, 1967  3 Sheets-Sheet 2
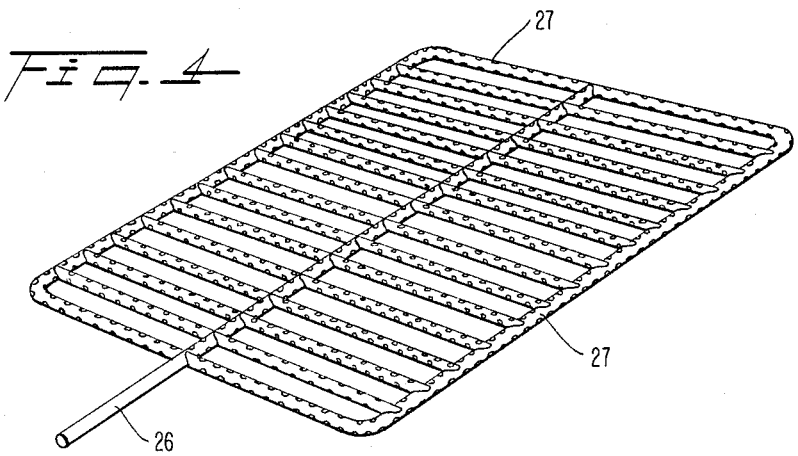
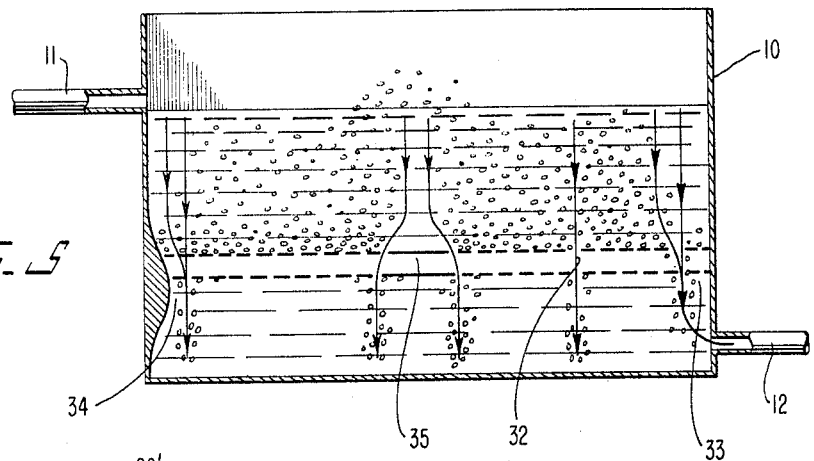
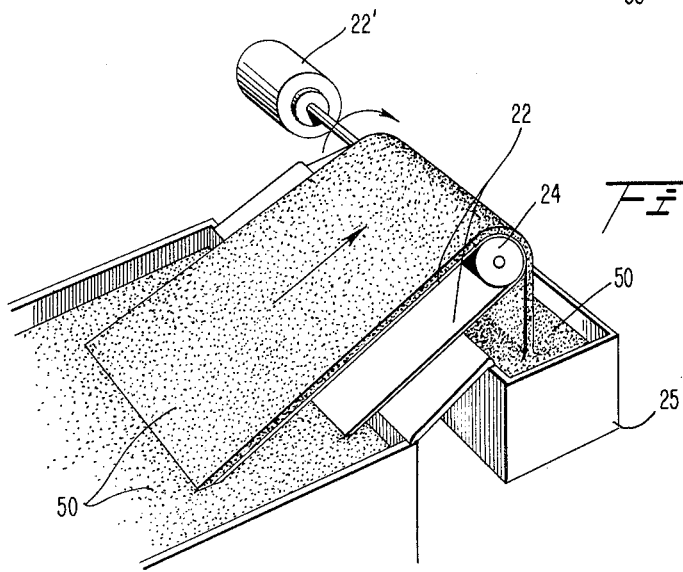
INVENTORS
TIVADAR KIKINDAI
JEAN LOUP BURGAUD
BY *Bauer and Seymour*
ATTORNEYS

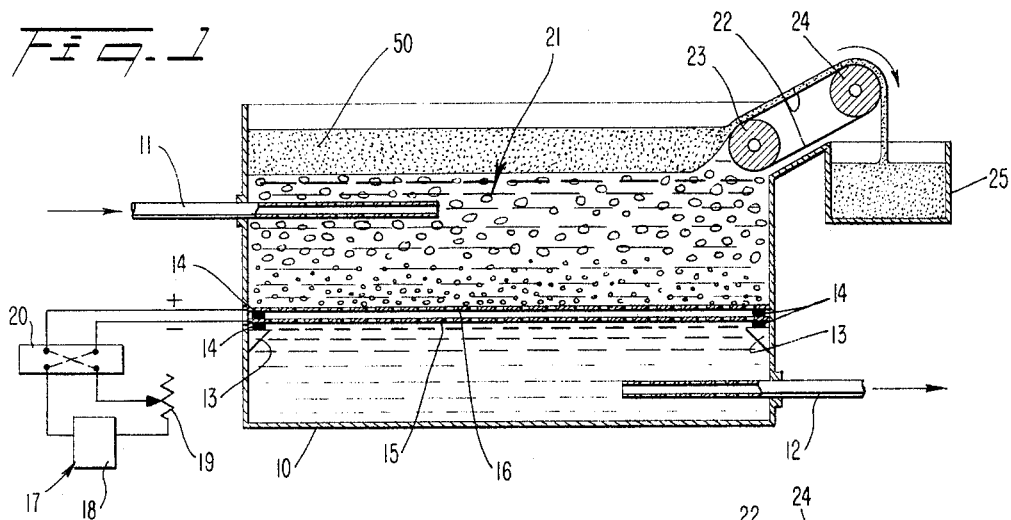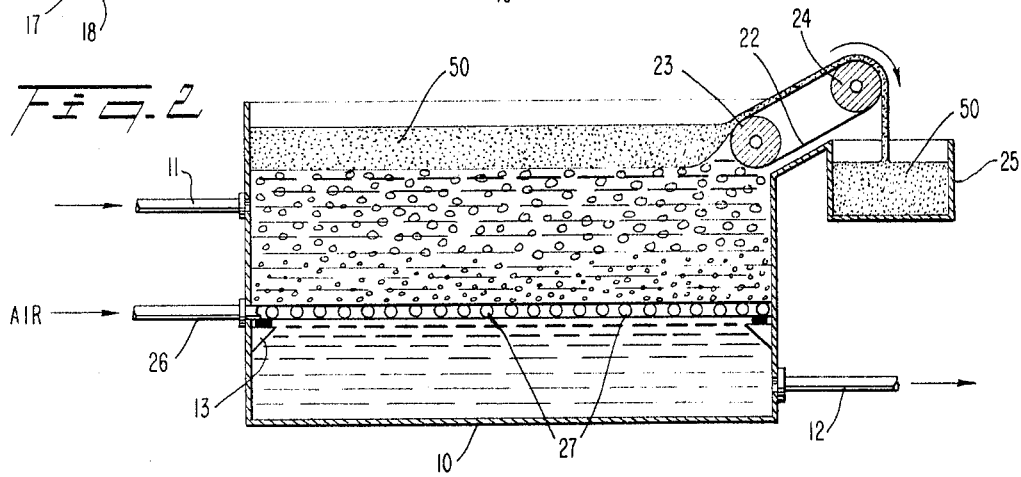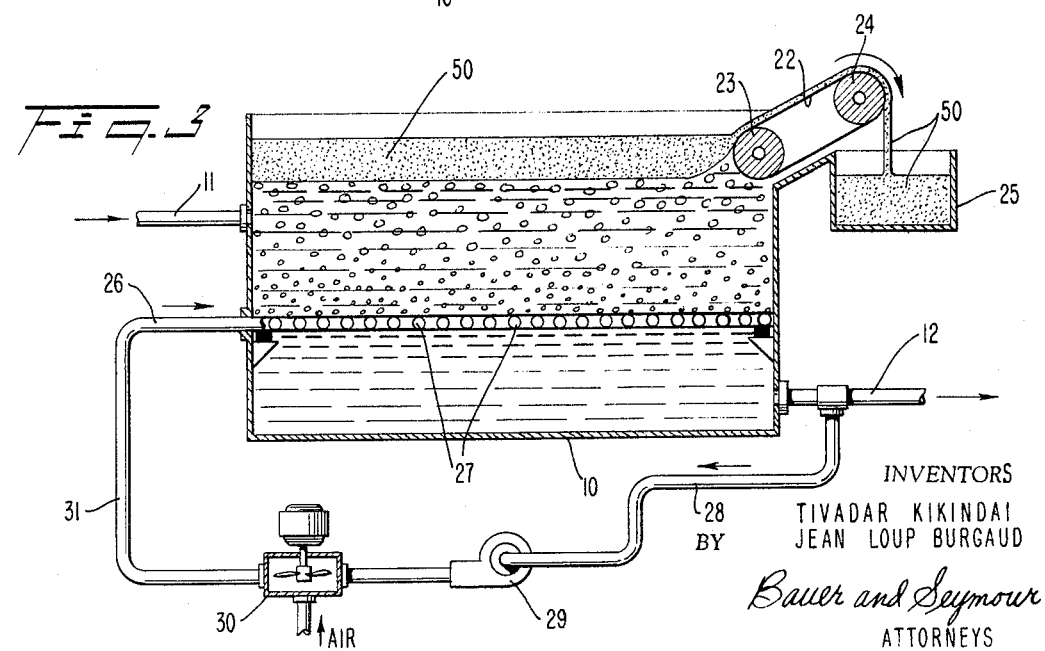

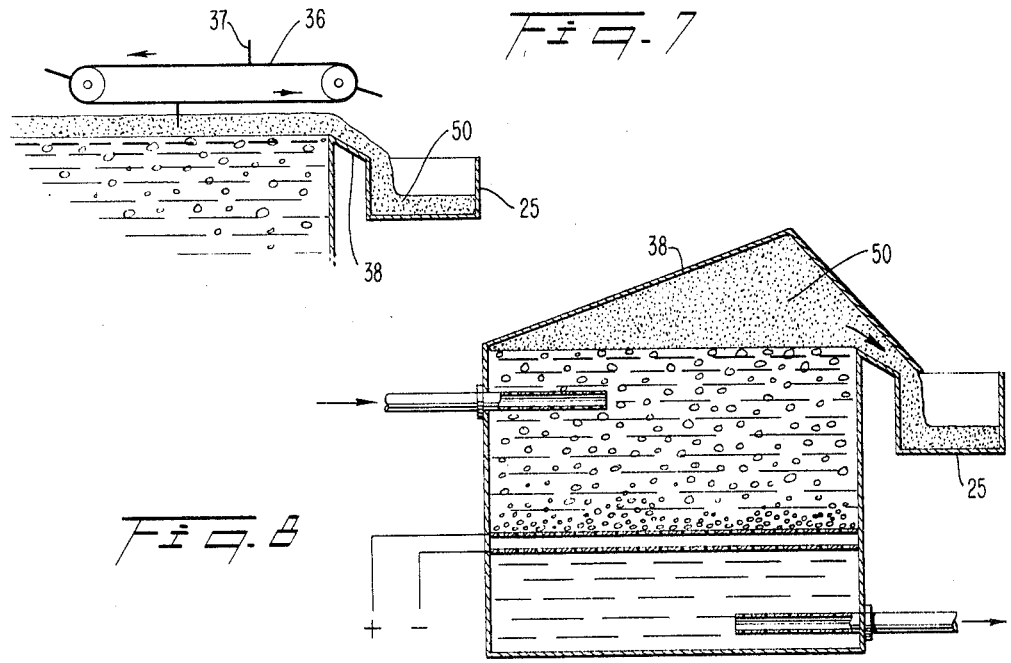
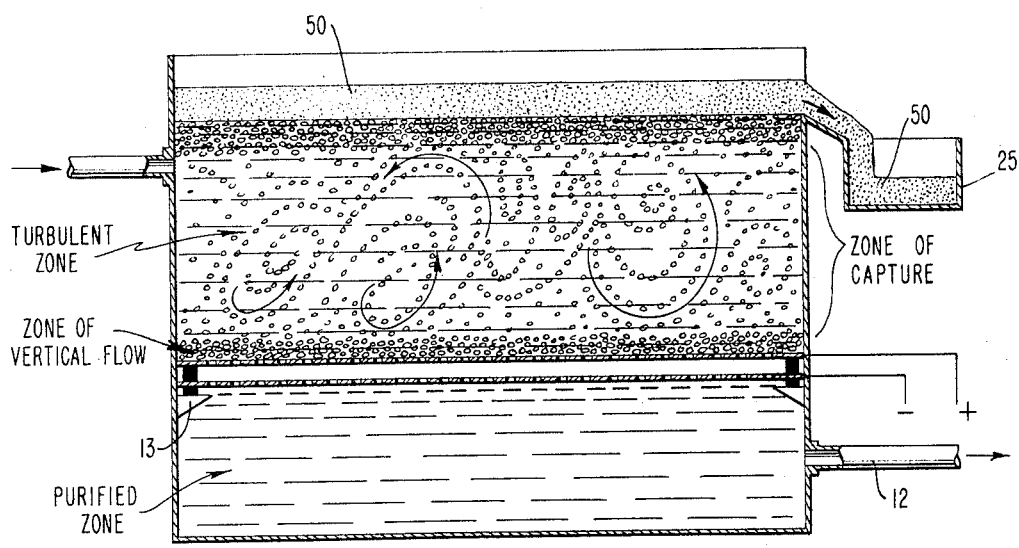

United States Patent Office 3,479,281
Patented Nov. 18, 1969

3,479,281
METHOD AND APPARATUS FOR THE SEPARATION OF PHASES BY GASEOUS FLOTATION
Tivadar Kikindai, Bourg-la-Reine, and Jean Loup Burgaud, Paris VIIIeme, France, assignors to Saint-Gobain Techniques Nouvelles, Courbevoie, France
Filed Oct. 13, 1967, Ser. No. 675,192
Claims priority, application France, May 23, 1967, 107,318
Int. Cl. C02c 1/26; C02b 1/10
U.S. Cl. 210—44               6 Claims

ABSTRACT OF THE DISCLOSURE

Insoluble suspended matters such as residual materials, chemical organic or mineral precipitates, oils and other immiscible liquids, dusts, fibers, and organisms are removed from water by floating the insoluble particles by means of gas bubbles rising through the liquid. The bubbles are generated in the liquid itself, preferably electrolytically, are very small and attach themselves to the fine insolubles which they carry to the surface where they form a sludge which is readily removed. The process may be in batches or continuous and novel apparatus is provided for the continuous process including a vat, foraminous electrodes which occupy the whole section of the vat, an inlet for the untreated water above the electrodes, an outlet for treated water below the electrodes, and a sludge removal system.

---

This invention relates to the removal of a phase by flotation from a liquid containing the phase and to apparatus for the purpose. The invention is applicable to many industrial processes. The flotation may involve various methods of generating the bubbles which attach themselves to the particles of the separable phase, but for the purpose of this specification the invention will be described in its preferred mode in which the bubbles are generated electrolytically. This particular description is for the purpose of illustration and does not limit the generalities of use and construction which will be explained.

There are, in various fields of industry, effluents from the operating processes, usually aqueous, which contain a separable phase. In the paper industry the effluent, or waste waters, from the manufacturing process contain cellulose fibers and, sometimes, mineral fillers such as kaolin. In the meat industry the waste from the abattoirs contain animal fats and other separable ingredients. In the manufacture of iron products, for instance in the rolling mills, the effluent waters contain oil and particles of iron. In the petroleum industry numerous products having density inferior to that of water are separable only with difficulty by ordinary methods such as decantation or centrifugation. In the biological world it is desirable to separate bacteria and microorganisms from liquids without destroying them. Some industries contain phases, such as latex or plastics, which are hydrophobic. Many of the rivers and streams of the world are contaminated with all sorts of contaminates.

It is an object of the invention to provide method and apparatus for separating such phases from the liquids in which they are suspended.

Another object is to provide methods and apparatus which are useful not only with liquids in which the population of suspended materials is dense but in which concentrations are low.

As the examples chosen for illustration involve the waste waters from various industries the discussion will proceed with the use of such terms but it is to be understood that it is equally applicable to the removal of separable phases from liquids.

In order to resolve the problems of separating a suspended phase from waste water, industry has used the technique of flotation by introducing bubbles of gas into the liquid which attach themselves to the particles of the separable phase, which may be either solid or liquid, imparting an apparent density to the particles which is less than that of the liquid which contains them and which transports them to the surface from whence they can be removed. It is to be noticed that the process is distinguished from the process of separation by frothing, producing different results by different phenomena.

The flotation processes and apparatus heretofore known have a major difficulty in that bubbles of gas produce substantial turbulence in the volume of liquid immediately above the point at which the bubbles are released, this turbulence acting to carry impurities into the purified liquid. As there was no possibility of increasing the number of bubbles to any substantial extent, e.g. to produce froth, the liquid effluent was difficult to clarify and the purification was onerous.

The present invention avoids those difficulties because it improves the processes of flotation and presents novel apparatus for the continuous separation of immiscible solids or liquids which are in suspension in a liquid to be purified. Some of the major characteristics of the present invention are these: In a tank acting as a flotation cell one or two foraminous walls are horizontally emplaced at a distance sufficiently above the bottom to provide room for the purified water to collect in a pool from which it is drawn off at a rate equaling the rate of admission of waste waters. The input and discharge ports are located respectively on opposite sides of the foraminous wall; the bubbles for flotation being released at the level of the foraminous wall. The incoming liquid circulates within the cell and the haze of bubbles passes approximately countercurrent to it. As the clarification by the process proceeds the liquid passes into a zone of the cell where the bubbles are being formed, are most active, and the least charged with particles, therefore capable of producing the most effective separation. The several means of producing bubbles produces in the zone immediately above the foraminous wall a vertical flow of ascendant bubbles which are quite uniform throughout the cell. The probability of capture is increased because it is arranged that the ascending bubbles counter an equally uniform descending flow of liquid. Above the calm zone adjacent the foraminous wall another zone provides turbulence which assures a rapid and uniform distribution of the suspended phase throughout the mass of liquid in movement and, at the same time, the turbulence assists in perfecting such flocculations as may be proceeding. Below the foraminous wall, which obstructs the whole horizontal area of the vat, is a calm zone which is established by regulating the rate of inflow, per square meter of the wall, of the waste water. The solid particles attached to bubbles are not carried into this quiet zone and the purified liquid which finds its way there is withdrawn at a rate which balances the input of waste water above the wall.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a diagrammatic vertical section through a preferred form of the invention;

FIG. 2 is a similar section through a modified form;

FIG. 3 is a further modification in a similar section;

FIG. 4 is a perspective view of a bubble generator of penumatic type;

FIG. 5 is a diagrammatic sketch illustrating certain phenomena which accompany the performance of badly designed cells;

FIGS. 6, 7 and 8 are alternative methods of discharging sludge from the surface of the separator, FIG. 6 being in perspective and FIGS. 7 and 8 in vertical section; and FIG. 9 is a diagrammatic vertical section illustrating the zone formation within an operating cell of electrolytic type.

The preferred separator is electrolytic and includes a tank 10 in the upper portion of which an inlet pipe 11 admits waste waters and near the bottom pipe 12 withdraws purified water, the rates of input and discharge being balanced to maintain a constant liquid level in the separator. Brackets, or a continuous ledge, 13 supports gasket 14 of rubber or other inert and non-conductive material upon the first of which is placed a foraminous metal electrode 15, a second foraminous electrode 16 being mounted on the upper gasket 14 which rests upon electrode 15. The foraminous plates or walls are horizontal, extend throughout the area of the vat and are attached respectively to the positive and negative poles of a source 17 of direct current. If the vate is non-conductive, the electrodes may engage the walls but if it is conductive, they should be insulated from the walls. In the drawing the apertures in the upper foraminous plate are offset from the apertures in the lower as a device for establishing still zones above and below the wall, for equalizing the passage of liquid through the wall, and for preventing the formation of preferential currents. The use of a continuous ledge, extending around the inside of the tank to support the wall, also contributes to these effects. The source of current 17 includes a generator 18, rheostat 19, a commutator 20, and, if need be, a rectifier. The current passing vertically from one foraminous plate to the other decomposes the liquid and produces at the electrodes a uniform flow of fine gas bubbles 21, which attach themselves to particles in suspension and give them a reduced apparent density and an upward movement toward the surface where bubbles break and the solids remain, forming a sludge 50. The sludge is removed from the surface by a conveyor 22 which may be of fourdrinier wire traveling around driven rollers 23, 24 or of a fibrous fabric. A trough 25 receives the discharged sludge and transports it elsewhere. If the sludge tends to cling to the conveyor, known means may be used to dislodge it. In many instances the entire surface of the liquid may be cleaned by a conveyor of this type operating at one end.

In FIG. 2 is shown a modification in which bubbles are generated pneumatically by a grate of the kind shown in FIG. 4 wherein a central pipe 26 distributes air to the lateral pipes 27 of the grate, all of which are perforated. Compressed air admitted to pipe 26 is distributed to pipes 27, uniformly, and issue from the perforations as fine bubbles. The grate occupies the whole section of the tank. Instead of injection compressed air into the grate chemical reactants which generate bubbles can be passed into it and out through the uniformly distributed perforations which are sufficient in number, diameter and distribution to provide that the aforesaid bubbles occupy the whole section of the tank above the grill uniformly. When air is injected it may be provided by a compressor or any other source. When chemical reactant is employed, it may be a liquid which will react to produce fine bubbles when it engages the liquid to be purified; an example of such chemical reactants are sodium carbonate in a liquid of low pH.

The cell of FIG. 3 is identical with that of FIG. 2 except that a part of the purified liquid is withdrawn from pipe 12 through pipe 28 by a pump 29 from whence it proceeds to a chamber 30 where it is charged with compressed air and delivered by a pipe 31 to pipe 26. As the charged, purified liquid is discharged through the perforations of pipe 27, the compressed air is released as bubbles, and the purified liquid sinks and passes out through pipe 12.

The tank 10 may be of any shape such as polygonal, cylindrical or parallelepipedic. According to the space available, the discharge pipe, and the input pipe, may be as long or as short as desired and may be provided with one or many openings along its length. It is constructed so as to avoid establishing preferential currents through the tank. As the input and outflow of liquid are controlled so as to afford the laden bubbles the least possible tendency to flow downward through the bubble generator, the unit rate of liquid flow per unit of surface of a horizontal section of the tank is limited. Because of the perfect uniformity of vertical flow of the bubbles and of the waste liquid, it is possible to work with a flow of liquid having a speed very close to the speed at which the laden bubbles would be drawn downward without fearing local entrainments which would occur if the flow were not uniform and which would sharply reduce the yield. Tests of flotation by electrolysis in a particular example have shown that it is possible to adopt a waste liquid speed of 4 m./hr. which is less than the speed at which the laden bubbles would be drawn downward (4.3 m./hr.) by less than 10%. The inflow and outflow means may be of the same type and their nature has little importance and can be reduced to simple ports in the tank wall as shown in FIGS 2 and 3 so long as the turbulence above the foraminous wall does not set up internal streams which pass through the bubble generator.

The gas generators may be distributors of gases already in existence, or they may distribute liquid saturated with a gas, or they may distribute chemicals which generate bubbles. They may also general bubbles on their surfaces as in the case of the electroflotation of FIG. 1. The technology corresponding to the several conceptions is different. The distributors of the type of FIG. 4 are generally distributional networks for fluids either gaseous or liquid or even solid. In the latter case, for example, sodium carbonate in an acid effluent; in which case the flotation of solids occurs at the same time as the indispensable neutralization and therefore practically without additional expense. The distributing grid exists as a network of perforated tubes arranged in any desired shape such as star, accordion, or spiral. They may be moved slowly, for example with circular motion when the tank is cylindrical to reduce inequality of distribution of gaseous and liquid bubble generating fluids due to loss of heat between the point of input and the part of the distributor most remote from it. The conduit of admission may be divided into branches so as to equalize the pressure of discharge at all points of the distributor.

The bubble generators of electrolytic type may exist in different forms of high efficiency and low cost. The foraminous wall may have its electrodes arranged in a single layer or in a plurality of vertically spaced layers.

When one electrode grill is used, it may be composed of woven material in which alternate parallel filaments are positive and negative and connected to the appropriate line of the power source, the space between the electrodes being filled with non-conductive material serving to prevent the passage of solids without interrrupting the flow of current. When two electrode sheets are used, they may be perforated and vertically spaced, each one constituting a grill, a trellis, or a metal sheet. Where two electrodes are used, the upper must have apertures which allow the bubbles generated on the lower electrode to pass into the zone of capture and both electrodes must permit the downward flow of the purified liquid, as in FIG. 1, wherein the electrodes themselves tend to establish quiet zones immediately above and below them. Electrodes may also be constructed of a woven grill in which the warp threads are insulating and the woof threads are conductive, or vice versa. The two electrodes may be inclined one to the other to equalize the flow of current and to minimize the effect of voltage drop.

The electrodes may be flat or curved and may be made from materials which resist corrosion such as platinum, stainless steel, or platinum-plated titanium. The spacing of electrodes 15 and 16 should be arranged so as to limit the useless expenditure of electrical current while avoiding short circuits and preferential current flow. The voltage applied to the electrodes should be chosen so that the quantity of gas produced will capture the phases to be removed and float them to the surface. Very fine bubbles, of which the production is easily regulated accomplishes the flotation with a very small quantity of gas, usually a few tens of cubic centimeters per gram of floated material. The process is consequently very economic. During electroflotation some wastes tend to attach themselves to the electrodes, reducing efficiency as they increase in thickness, but this is of small importance because they can be removed and the electrodes cleaned by reversing the flow of current between the electrodes.

It is advantageous to establish a zone of uniform vertical flow immediately above the foraminous wall, and our studies have determined certain causes for the preferential channeling of flow through the wall and have provided means for their correction. Some of the causes of unbalanced flow and means for their correction are indicated in FIG. 5. Occasionally it may occur that a free passage is offered through both electrodes as at 32 in FIG. 5, or along the wall past the electrode as at 33. These imperfections are readily corrected if the grill which serves to distribute the bubbles produces and distributes the bubbles uniformly such as by a woven plate of uniform apertures, or by providing tight joints at the wall as indicated in FIGS. 1, 2 and 3. Sometimes the shape of the tank walls produces channeling as at 34 in FIG. 5, or some variation in shape of the tank itself tends to concentrate minor streams and produce local increases of flow. There are also occasions in the geometry of the system of bubble production, as indicated at 35 in FIG. 5, which produce local increases in speed of flow. The condition indicated at 35 in FIG. 5 is one in which sections of the electrodes have become blocked. Such conditions are readily corrected once their existence has been discovered and the cause determined.

In FIGS. 6, 7, 8 are shown three methods of, and apparatus for, removing the sludge from the surface of the pool. In FIG. 6 an endless belt 22 between rollers 23, 24, of which 23 is submerged in the liquid beneath the sludge, elevates the contiguous sludge from the tank and deposits it in trough 25 while drawing the sludge 50 toward itself across the surface of the pool. A motor 22′ drives the belt. At the high point of the belt the sludge may be dislodged pneumatically, by a doctor blade, by vibration, or any other known method. The waste material flows along the trough and is disposed of according to its nature.

In FIG. 7 a belt 36 provided with paddles 37 which dip into the sludge moves the sludge toward a chute 38 and into the trough 25.

In FIG. 8 is illustrated a form of cell which is closed for the convenience of certain processes, frequently processes in which the sludge is very light and tends to build up into a type of mobile foam. The pressure exerted by the ascending bubbles combines with the shape of the cover 38 to flow the waste material into the trough 25. In many operations of these cells (FIG. 9) five zones are established which are readily distinguished. At the base of the cell is a zone in which the purified liquid forms a pool which is quite calm and has only slight horizontal motion derived from the rate of withdrawal through pipe 12. Immediately above the electrodes is a zone of vertical and uniform flow, a continuous tight joint 13 being provided around the wall of the tank to prevent channeling of flow at the wall. Above the zone of vertical flow is a zone of some turbulene in which arrives the inflow of waste waters through pipe 11. The turbulent zone and the zone of vertical flow constitute a zone of capture. The existence of the turbulent zone is interesting because it provides for the rapid and uniform distribution of the liquid which is to be purified so that the particles which are to be removed are uniformly dispersed throughout the width of the tank even though the input is at a single point. In difficult cases more than one input point can be employed, appropriately located to secure uniformity of particle dispersion. It is in this zone, furthermore, that flocculation tends to take place when the nature of the phases admits of it. Above the turbulent zone is a zone of sludge formation where horizontal movement in very small and the breaking of bubbles and concentration of the sludge takes place. The sludge 50 contains very little water, in most casts.

The following examples indicate the wide applicability of the process in two different industries and particular conditions of operation for particular industries, but these examples do not detract from the generality elsewhere herein stated.

EXAMPLE 1

A paper mill continuously discharges waste waters having a pH between 5.6 and 7.2, containing between 300 and 950 mg./l. of insolubles constituted essentially of cellulose fibers, into the river beside it. These waste waters were treated in an apparatus similar to that of FIG. 1, the tank having a square shape of 8 cm. on its side and 60 cm. of useful height (above the electrodes). The waste waters were introduced above the electrodes at about 15 cm. below the free surface of the liquid. The discharge of treated water occurred below the electrodes. The electrodes were metal grills of stainless steel (18/10) spaced 4 mm. apart throughout the whole section of the tank (64 cm.$^2$). The current was supplied by a dry selenium rectifier under the following conditions: Current intensity—0.45 a. (about 70 a./m.$^2$ of surface); potential difference—12 v.; water flow—26 l./hr. or 4 m.$^3$/hr./m.$^2$ of surface. The purified water contained 5 to 15 mg./l. and the pH was identical with that at input. Thus, there was almost total recovery of the cellulose fibers from the waste waters. The cellulose sludge which was skimmed from the surface of the pool contained so little water that it could be recycled directly to the manufacturing process and used in making paper. The water discharged had been purified to the extend necessary to conform to the laws of France. The consumption of electrical energy was about 0.2 kw.-hr./m.$^3$ of water treated; the average reduction in the content of insolubles was 98.5%; the time of residence of the waste waters in the cell was about 10 min. and about 11 l. of gas were consumed per cubic meter of waste water treated, or about 16 cc./g. of dry recovered cellulose fibers.

EXAMPLE 2

A paper mill discharged waste waters, of which the pH was between 6 and 7, containing 690 mg./l. of insolubles of which 150 mg./l. were cellulose fibers and 540 mg./l. kaolin filler. The waters were treated in a cell like that of FIG. 1 of 120 cm. useful height and 50 cm. per side. A flocculator of 150 l. capacity preceded the cell. The flocculator also received 100 mg./l. of $Al_2(SO_4)_3$, and 40 mg./l. of soda. In the cell the current intensity was 20 a. (80 r./m.$^2$ of surface), the potential difference 12 v., the flow of waste waters 1000 l./hr. or 4 m.$^3$ per m.$^2$ of surface. The purified water contained less than 5 mg./l. of insolubles and the pH was 7–8. The sludge was recycled.

The consumption of energy was about 0.24 kw.-hr./m.$^3$ of waste water treated, the reduction of insolubles was 99%, the average residence time in the cell 22 min., the average residence in the flocculator 9 min., and the gas produced 12.5 l./m.³ of waste water treated, or about 18 cc./g. of dry solids separated.

EXAMPLE 3

A commercial installation in a paper factory had a cell surface of 25 m.², a volume of 25 m.³, low carbon inoxidizable electrodes 18/10, current density 80 a./m.³, potential difference 10 v., consumption of electricity 200 watt-hr./m.³ of waste waters treated which contained kaolin ~30 mg./l. of $Al_2(SO_4)_3$; the sludge was skimmed off by paddles (FIG. 7) and contained 90 to 95% of water.

The waste waters contained ≤1 g./l. insolubles after drying at 110° C. The insolubles were cellulose fibers plus some kaolin, and the rate of flow was ~100 m.³/hr.

The purified water contained ≤30 mg./l. of insolubles.

EXAMPLE 4

An industrial abattoir rejected waste waters from a bacteria bed, often called trickling filter the thickness of which increased rapidly by deposition of the greases, which were finely dispersed and could precipitate by gravity only very slowly. These waste waters were first treated, in a cell like that of Example 1, with current of 0.4 a. or 62 a./m.² of surface, at 13 v., at a flow of 32 l./hr. The purified water held less than 15 mg./l. of greases, and could be sent through the bacterial bed without choking it. Energy consumed: 0.16 kw.-hr./m.³ of waste water, residence 6 min., gas use 7 l./m.³ of water treated, efficiency 98% ±.

EXAMPLE 5

Water from a steel rolling mill, after preliminary decantation, contained 115–350 mg./l. of insoluble solids (iron powder) and 300–600 mg./l. of insoluble palm oil, which could not be decanted. The pH was between 6.2 and 7.4 and the waters were black. The waters also contained several grams per liter of soluble sulfates and chlorides.

The waters were sent to a cell like that of Example 2 but which had platinum-coated titanium electrodes. No flocculation was attempted.

Current intensity—25 a. (100 a./m.² of surface of the cell); potential difference—8 v.; water flow—750 l./hr. or 3 m.³/hr./m.² of cell surface.

The purified water was clear, contained 30 mg./l. of insoluble solids, 15 mg./l. of oils, and had idential pH.

Energy consumed—0.27 kw.-hr./m.³; mean time of residence in the cell—30 min.; average reduction of insolubles—90%; average reduction in oils—97%; gas consumption—21 l./m.³ of water treated or 30 cc./g. recovered.

This treatment replaced a difficult and costly purification in hot acid medium under pressure.

EXAMPLE 6

Water from the rolling mill of a steel plant was treated in a cell having a surface of 25 m.²; a volume of about 25 m.³; titanium electrodes coated with platinum; current density of 100 a./m.² of the electrodes; 8 v. rectified current; about 275 watt-hr./m.³. A paddle skimmer was used to remove the sludge. The results of this commercial installation were comparable to those of Example 5.

The invention is particularly valuable in treating dilute suspensions. One of the important parameters affecting the efficiency of the process is the number of bubbles with respect to the quantity of solids in the waste liquor. Therefore, after approximately optimum conditions for a particular industry have been achieved, it is difficult and costly to increase very much the current density on the electrodes and the number of bubbles per unit of time and of surface. According to the nature of the insolubles and the magnitude of their concentration, the maximum efficiency is variable, but excellent results are usually attained when the concentration of insolubles is on the order of one to several grams per liter. The process is applicable to any rate of flow of the waste liquid and it is applicable continuously or in batches, the time of residence in either case being very short. The process is particularly valuable in that it requires almost no regulation. Another advantage is that it is very rapid.

The process is applicable to a vast number of insolubles encompassing preferential use of electroflotation in any situation in which natural decantation or decantation by centrifuge, hydrocyclone and the like is inefficient. Even when decantation yield satisfactory results this process is frequently to be preferred for technical and economic reasons.

In one general category of uses the density of the dispersed phase is less than that of water and separation by decantation is bad either because of too small a difference in density or because the insolubles are dispersed and suspended. Among such cases are the petroleum industry; metallurgy, especially in treating the aqueous or oily effluent from rolling and cutting; abattoirs; the food industry such as the manufacture of cooking and heating oils and preserves; and in the milk industry. In all these cases such fluids are capable of being treated with great success by this invention.

Another category involves the treatment of liquids containing insoluble fibers such as cellulose fibers from the manufacture of paper and the wood industry, the treatment of waters containing glass fibers, those containing fibers of asbestos, the textile industry and the effluent from the preparation of vegetables.

Another category in which the process is very useful is that in the treatment of effluents containing biologics such as bacteria and microorganisms which are destroyed in some processes but which are not harmed by this invention. In such processes the speed of separation by this process is superior to processes now in use and the sludges obtained are of lesser water content than those produced by some prior art methods.

Some categories of processes produce insolubles which are not readily aided by water. For example those derived from the latex and plastic industry and which are difficult to extract by known methods but are readily extracted by the present invention.

The process is also of use in the purification of contaminated river water, of waters containing iron oxide, for instance that derived from the manufacture of glass, and the white water from paper plants containing "charges."

In these and in some other cases it is desirable to precede the actual treatment by an ordinary flocculation.

In all these categories the present process produces waters of which the content of insolubles is less than 30 mg./l., which satisfies the most severe requirements, and very often the residual content in the discarded water is even less, to the point of being undetectable.

This invention improves the industrial process of flotation in which a liquid is separated from an immiscible phase such as a suspended solid or liquid, and it has the following characteristics:

The liquid to be purified travels vertically toward the bottom of the cell and its flow is approximately uniform through the whole area of the vat at the level of the gas-generating grill or grate; the ascending flow of fine bubbles is subbstantially uniform near the generating source; the flow of liquid is regulated principally by the input of liquids to be purified per square meter of the gas-generating wall so that the bubbles which have captured solids or immiscible liquids ascend. As the flow is uniform, its speed can be established without risk very close to the speed of the ascending bubbles. A countercurrent flow of bubbles and waste waters occurs, the liquid being admitted as its clarification proceeds and eventually passing through a zone of the cell where the bubbles are formed, are most active, and least charged with particles. The cell is consequently of maximum efficiency.

The apparatus has the following points of novelty:

One or more foraminous walls are arranged very close to one another and occupy the whole of the free section of the tank serving as the flotation cell; the ports of admittance and discharge are on opposite sides of the foraminous walls; the distance which separates the lowest part of the foraminous wall from the bottom of the cell is sufficient to provide that the removal of clarified liquid does not disturb the uniformity or the speed of the liquid through the foraminous wall; the bubbles may be generated by any known type of generator but electrolytic generation is preferred; uniformity of flow of the liquid at the level of the bubble-generating wall is achieved partly by eliminating any possible free passage from above the wall to the sump beneath it; the construction of the cell is itself very regular and uniform, eliminating variations of section which might localize a flow and provoke local increase in the speed of the liquid; uniformity of flow through the foraminous wall is promoted by eliminating any discontinuity in the geometry of the system which produces the bubbles; a calm zone is provided above the generator of bubbles and above that a turbulent zone which secures the rapid and uniform distribution of suspended particles above the zone of bubble formation. In some cases the waste liquids may be subjected to flocculation before being sent to the cell. The cells may be operated in parallel or in series and may involve associated apparatus such as screens, filters, decanters, and centrifuges, in combination.

As many apparently widely different embodiments of the present invention may be made without departing from the spirit and scope thereof, it is to be understood that the invention is not limited to the specific embodiments.

What is claimed is:

1. Apparatus for the purification of water comprising, a tank, first means for removing sludge from the surface of a body of water in said tank, second means in said tank below the level of said first means and above the bottom of said tank for electrolytically generating and releasing bubbles uniformly throughout the horizontal sectional area of said tank, first conduit means for introducing water to be purified into said tank at a level between said first and second means, and second conduit means for withdrawing purified water from said tank below the level of said second means.

2. Apparatus according to claim 1, said second means including a foraminous baffle extending horizontally and substantially throughout the horizontal sectional area of the tank below the level of said first conduit means and above the level of said second conduit means.

3. Apparatus according to claim 2 and a second foraminous baffle in vertically-spaced relation with and parallel to said first-named baffle.

4. Apparatus according to claim 3, and means to supply said baffles with electrolytic current of opposite polarity, respectively.

5. The method of purifying water, comprising, establishing a pool of water to be purified, electrolytically generating flotation bubbles in the pool, at a first level below the surface of the pool and above the bottom thereof, uniformly over the horizontal sectional area of the pool at said first level, withdrawing purified water at a second level below said first level, while introducing water to be purified into the pool at a level between said first level and the surface of the pool, to thereby maintain the surface of the pool at essentially fixed elevation, and removing accumulated sludge floating on the surface of the pool.

6. The method of claim 5, and adjusting the rate of withdrawal and introduction of water from and into the pool, to effect a vertical velocity of water, of about 4 meters per hour, uniformly over and across said horizontal sectional area of the pool.

References Cited

UNITED STATES PATENTS

| | | | |
|---|---|---|---|
| 1,069,169 | 8/1913 | Parker | 210—44 X |
| 1,619,036 | 3/1927 | Ravnestad | 210—44 X |
| 2,335,209 | 11/1943 | Booth | 210—44 |
| 2,695,710 | 11/1954 | Gibbs | 210—44 X |
| 3,301,779 | 1/1957 | Kovacs | 210—44 |
| 3,347,786 | 10/1967 | Baker et al. | 210—61 X |
| 1,344,127 | 6/1920 | Greenawalt | 209—164 X |

OTHER REFERENCES

Dognon, A.: Concentration et Separation des Molecules et des Particles par la Methode des Mousses, Rewe Scientifique, vol. 79, 1941, pp. 613–619.

Hirlinger, K. A., et al.: Packinghouse Waste Trickling Filter Efficiency Following Air Flotation, Sew. and Ind. Wastes, vol. 29, February 1957, pp. 165–169.

MICHAEL E. ROGERS, Primary Examiner

U.S. Cl. X.R.

204—149; 209—164, 170; 210—47, 221; 261—124

Notice of Adverse Decisions in Interferences

In Interference No. 97,808 involving Patent No. 3,479,281, T. Kikindai and J. L. Burgaud, METHOD AND APPARATUS FOR THE SEPARATION OF PHASES BY GASEOUS FLOTATION, final judgment adverse to the patentees was rendered Mar. 5, 1973, as to claims 1–5.

[*Official Gazette July 10, 1973.*]